(12) United States Patent
Utukuri et al.

(10) Patent No.: US 12,088,955 B2
(45) Date of Patent: Sep. 10, 2024

(54) VIDEO DISPLAY SYSTEM

(71) Applicant: Vizetto Inc., Mississauga (CA)

(72) Inventors: Avanindra Utukuri, Mississauga (CA); Bhupinder Randhawa, Richmond Hill (CA)

(73) Assignee: Vizetto Inc., Mississauga (CA)

( * ) Notice: Subject to any disclaimer, the term of this patent is extended or adjusted under 35 U.S.C. 154(b) by 15 days.

(21) Appl. No.: 17/390,893

(22) Filed: Jul. 31, 2021

(65) Prior Publication Data

US 2022/0021838 A1  Jan. 20, 2022

Related U.S. Application Data

(63) Continuation of application No. PCT/CA2020/050093, filed on Jan. 26, 2020.

(60) Provisional application No. 62/799,677, filed on Jan. 31, 2019.

(51) Int. Cl.
| | |
|---|---|
| *H04N 5/46* | (2006.01) |
| *G06F 13/20* | (2006.01) |
| *G06F 13/36* | (2006.01) |
| *H04N 5/262* | (2006.01) |
| *H04N 5/38* | (2006.01) |

(52) U.S. Cl.
CPC ............... *H04N 5/46* (2013.01); *G06F 13/20* (2013.01); *G06F 13/36* (2013.01); *H04N 5/2624* (2013.01); *H04N 5/38* (2013.01)

(58) Field of Classification Search
None
See application file for complete search history.

(56) References Cited

U.S. PATENT DOCUMENTS

| | | | |
|---|---|---|---|
| 10,091,456 B2* | 10/2018 | Dickens | H04N 7/108 |
| 2008/0015015 A1* | 1/2008 | Walker | A63F 13/98 463/43 |
| 2012/0300129 A1* | 11/2012 | Hetke | G06F 13/4022 348/E5.057 |
| 2014/0115487 A1* | 4/2014 | Sandler | H04W 4/00 715/740 |
| 2016/0014442 A1* | 1/2016 | Sahdra | H04N 21/44029 725/54 |
| 2016/0094873 A1* | 3/2016 | Zou | H04N 21/43637 725/38 |
| 2017/0140131 A1* | 5/2017 | Greenberg | H04L 63/104 |

* cited by examiner

*Primary Examiner* — Elias Mamo

(57) ABSTRACT

Various embodiments of video display systems and related methods for wirelessly coupling video content from a plurality of video sources to one or more shared display devices are disclosed. The video display system includes a dongle for coupling to a video output of each of the video sources. In some embodiments, audio from some of the video sources may also be coupled to a shared display device, and may be reproduced at the shared display device. In some embodiment, video content from one or more video sources may be combined on one ore more of the shared display devices.

10 Claims, 13 Drawing Sheets

VIDEO DISPLAY SYSTEM

FIELD

The described embodiments relate to video display systems.

SUMMARY

Exemplary embodiments described herein provide details relating to systems and methods for displaying video signals from a plurality of video sources on a shared display device.

The embodiments described herein are exemplary only and other implementations and configurations are also possible.

Figure 1:
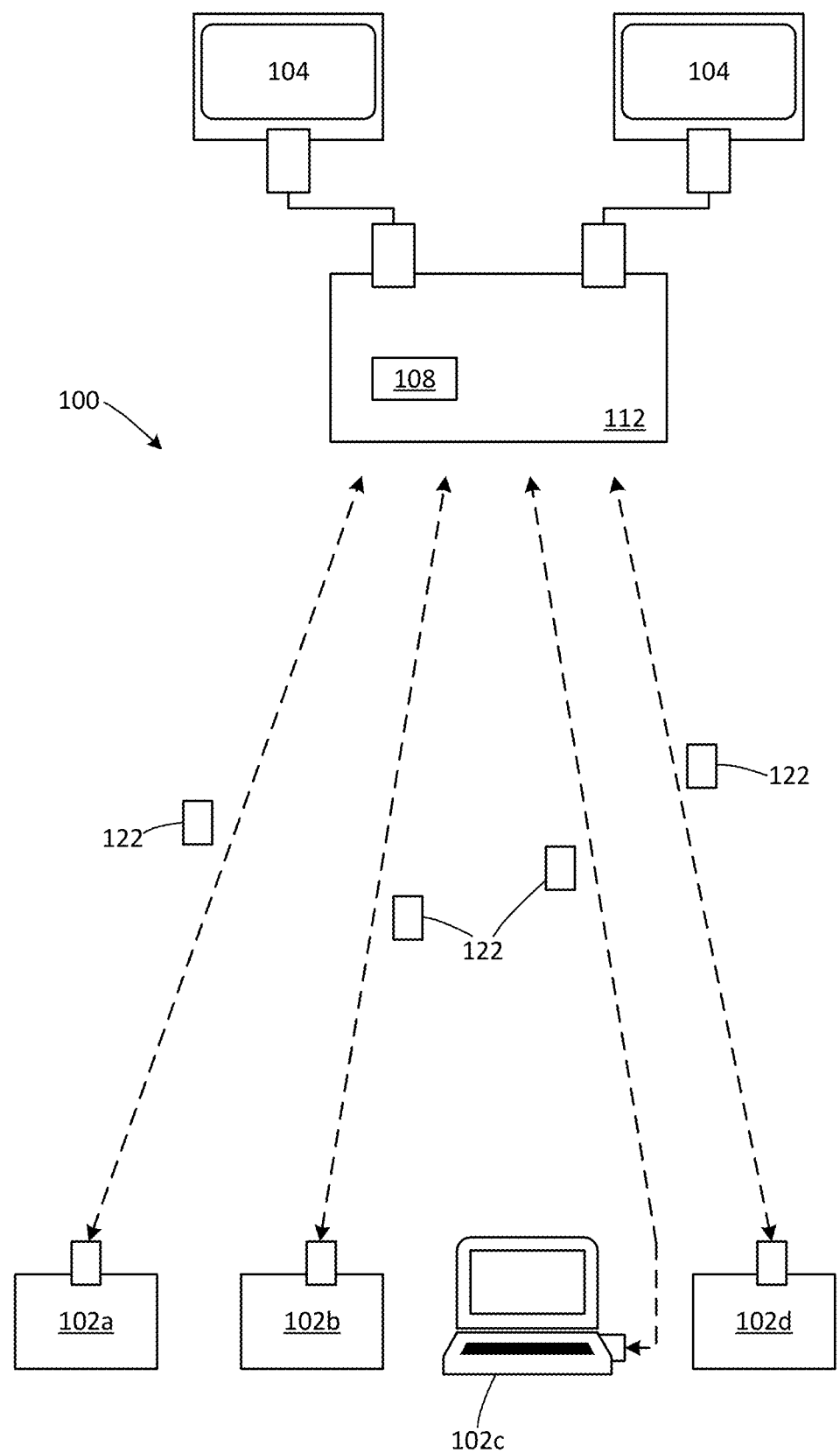
FIGS. 1 and 2 illustrate a first example display system.

The Figures are merely illustrative of the embodiments shown and described below. They are not limiting and are not drawn to scale.

DESCRIPTION OF EXAMPLE EMBODIMENTS

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

Terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

Terms such as "connected" and "coupled" mean that a first element is able to communicate or otherwise interact with another device, either through a direct connection or through intermediary devices. The connection or coupling may be physical, as with a connecter plugged into a corresponding hardware port, or virtual as with a software object that transmits data to another object. A connection or coupling be achieved using a physical cable or through a wireless network or communication means.

The wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and any combination thereof.

Program code may be applied to input information and data to perform the functions described herein and to generate output information. The output information is applied to one or more output devices, in known fashion.

A program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems, processes and methods of the described embodiments are capable of being distributed in a computer program product comprising a computer readable medium that bears computer usable instructions for one or more processors. The medium may be provided in various forms, including one or more diskettes, compact discs, tapes, chips, wireline transmissions, satellite transmissions, internet transmission or downloads, magnetic and electronic storage media, digital and analog signals, and the like. The computer useable instructions may also be in various forms, including compiled and non-compiled code.

Figure 2:
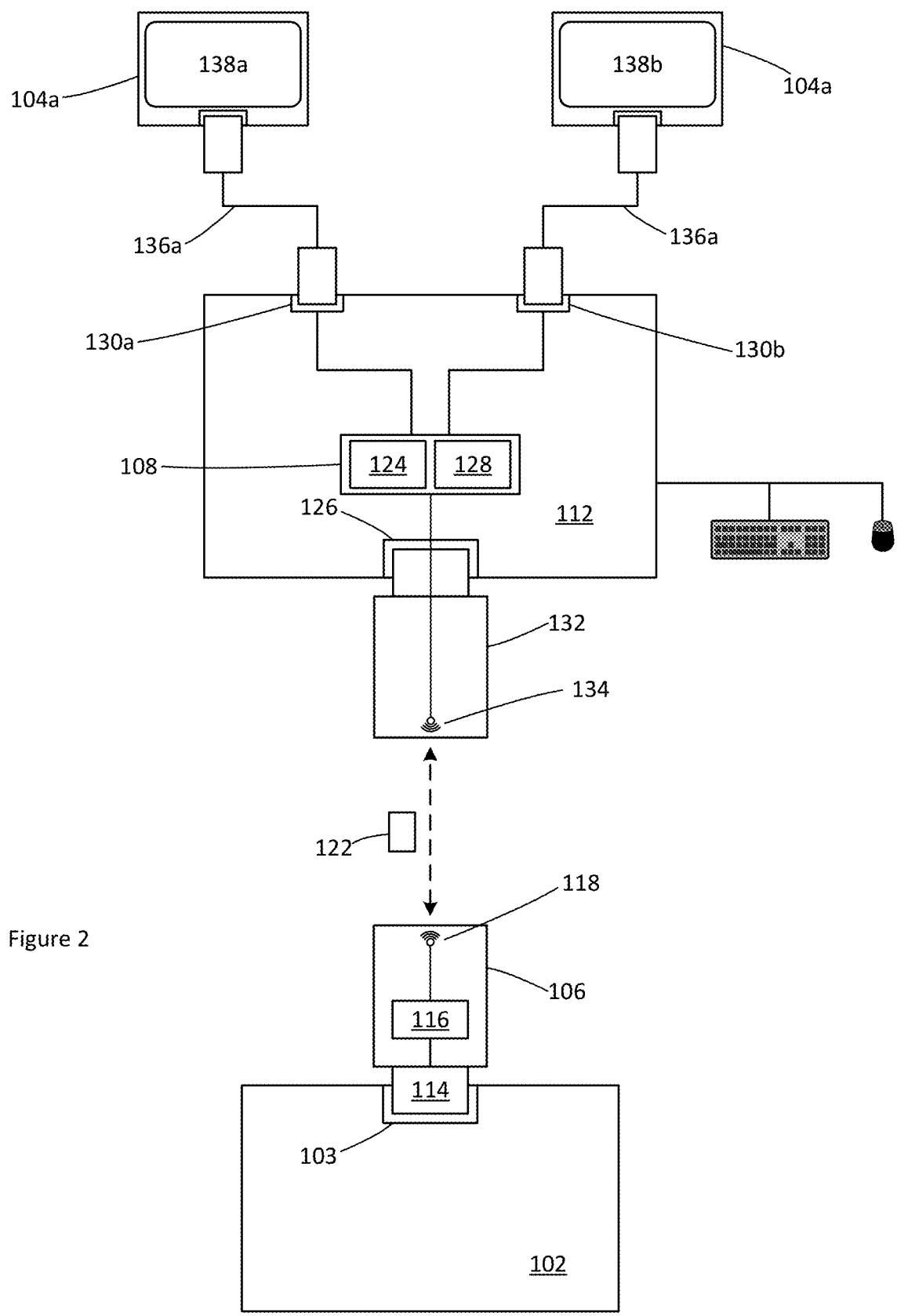

Reference is made to FIGS. 1 and 2, which illustrate a first video display system 100 for wirelessly coupling video output from a plurality of video sources 102 to one or more shared display devices 104. System 100 includes a plurality of video source dongles 106 and a display controller 108. Each video source dongle 106 is coupled to a respective video source 102.

In various embodiments, the video sources may be computers, gaming devices, DVD players, Blu-Ray players or any other type of video source, or any combination of video sources. Each video source 102 has a video output port 103, which will typically be compliant with a video standard such as composite video, Video Graphics Array (VGA), Digital Visual Interface (DVI), High-definition multimedia interface (HDMI), DisplayPort or another video standard. Some video standards may also specify one or more standard video port or video connector designs, and the specification of such a video port or connector may be referred to as a video connector standard.

In the case of video sources, such as a laptop computer 102c, that have an integrated or other primary display screen 110, a display screen coupled to the output video port may be referred to as an external, secondary or peripheral display screen. Some laptop computers (and other video sources) may be configured to display the same content on the external display screen as on the primary display screen in a "mirror mode". Some laptop computers may be configured to display different content on the external display screen as on the primary display screen, typically in a visual space that is adjacent to the primary display screen, in what may be referred to as "extension mode". Various laptop computers may have these and other modes, such as external monitor only mode.

The display controller 108 may be a software or hardware controller. In this example, display controller 108 is a software controller operating on a multi-purpose or general purpose computer 112. A hardware display controller may include embedded software, firmware and other software components.

Each video source dongle 106 has a video source connector 114, a dongle processor 116 and a dongle transceiver 118.

At each video source 102, the video source connector 114 may be connected to a compatible video output port 103 on the respective video source 102. For example, a computer dongle may have a VGA, DVI, HDMI, DisplayPort or other video connector that is plugged in to a corresponding video port on a video source. Typically, the video connector and the corresponding video port will be compliant with a video connector standard, although in some embodiments, a non-standard video connector may be used. The video source dongles in any particular embodiment may have video signal connectors that are compliant with different video connector standards. For example, some of the video source dongles in an embodiment may be compatible with a DVI connector standard while others are compatible with HDMI or DisplayPort or other video connector standards.

At each video source 102, the corresponding video source dongle 106 is coupled to the output video port 103 and receives a source video signal 122. Dongle processor 116 receives the source video signal 122 through video source connector 114. Dongle processor 116 may, depending on the corresponding video standard, communicate bi-directionally with a graphics processor or graphics module in the video source to facilitate the transmission of an appropriate source video signal from the video source. For example, some video standards provide for particular pins in the corresponding video connector to be used to identify a monitor size or resolution for an external display screen. Some video standards include a communication or handshake protocol that provides for the exchange of external monitor information (such as model, recommended resolution, active resolution, etc.), digital rights protection information and other information. The dongle processor 116 communicates with the video source 102 in accordance with the video standard to, as permitted or required, control the resolution and other characteristics of the output video signal. Each video source dongle 106 interfaces with the corresponding video source 102 as an external monitor.

Dongle processor 116 transmits the source video signal 122, in either its original form or in a converted form of the source video signal, as explained below, to display controller 108 through dongle transceiver 118. The source video signal 122 may be transmitted to the display controller in any format. For example, the source video signal 122 may be encapsulated in a packetized data signal, in a radio frequency (RF) signal, it may be converted into a different video format or otherwise transmitted to the display controller. Source video signal 122 may be transmitted using any standard or proprietary wireless communication protocol.

In this embodiment, each dongle processor 116 receives a source video signal 122 from a video source connector 114 that is coupled to the corresponding video source 102, in accordance with a video signal standard, as discussed above. Any particular source video signal 122 will typically be adapted to be displayed directly on a video monitor and will typically be consistent with a video display interface such as composite video, HDMI, DVI, DisplayPort, SDI, etc. The dongle processor 116 is programmed with video source dongle software that extracts video information from the video signal and generates a corresponding packetized video signal, which encapsulates the extracted video information. In some embodiments, the packetized video signal may be generated in a standard digital video or multimedia container format. For example, the corresponding packetized video signal may, for example, be in an MP4, AVCHD or other video encoding format. The video content of the packetized video signal corresponds to the source video signal 122, although the packetized video signal may optionally be compressed or otherwise modified in accordance with the corresponding video encoding format. The source video signal 122 is transmitted to the display controller 108 encapsulated in the wireless video signal.

Central computer 112 includes a data communication port 126, a display controller 108, and one or more video display ports 130. In this embodiment, a controller dongle 132 is coupled to the communication port. Data communication port 126 may be any type of data communication port, such as a USB or other serial port, or any type of parallel or other communication port. The controller dongle 132 includes a controller transceiver 134, which is coupled to the video signal processor through data communication port 126. Controller transceiver 134 communicates with each dongle transceiver 118 to receive the respective source video signal 122 from each video source 102. The dongle transceiver 118 and controller transceiver 134 may communicate using any wireless communication protocol.

In this embodiment, the display controller 108 includes a display management module 124 and a video signal processor 128. Each of the display management module 124 and the video signal processor 128 are provided in the form of a software component operating on the central computer 112, and may make use of graphics processors in the central computer 112. The display management module 124 is operable to allow the display of source video signals 122 on the display devices 104 to be controlled by a user. The display controller 108 is coupled to the controller transceiver 134 to receive each of the source video signals 122.

At central computer 112, video signal processor 128 receives each of the source video signals 122 transmitted from each video source dongle 106. Central computer 112 is coupled to one or more display devices 104. Typically, central computer 112 will include one or more video output ports 130, and each display device 104 is coupled to one of display devices 104, typically through a video cable 136. In this embodiment, central computer is a typical standalone computer with various human interface devices (HID) including a keyboard and mouse. The central computer generates an output video signal 138 that is displayed on each display device 104. Each display device may, for example, be a television set, a monitor, video headset or other system capable of generating a visual display. A central computer user may use the central computer to control the images shown on each of the display devices 104.

In system 100, as shown in FIGS. 1 and 2, the central computer 112 is coupled to the display devices 104 through wired cables 136. In other embodiments, the central computer 112 may be coupled to one or more of the display devices 104 through a wireless communication channel.

Referring also to FIGS. 3a-3e, each output video signal 138 may include one or more of the source video signals 122.

Figure 3A:
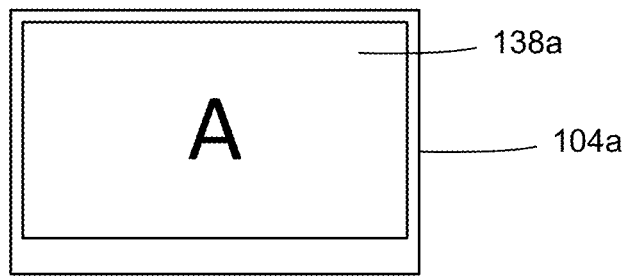
FIGS. 3a-3e illustrate example output video signals.

FIG. 3a illustrates a display device 104a on which an output video signal 138a is displayed. Output video signal 138a consists entirely of source video signal 122a. In this example, the source video signal 122a (having content represented by the letter A) generated by video source 102a is shown on the entire display screen 104a, and, in effect, display screen 104a appears to be an external display for the video source 102a.

Figure 3B:
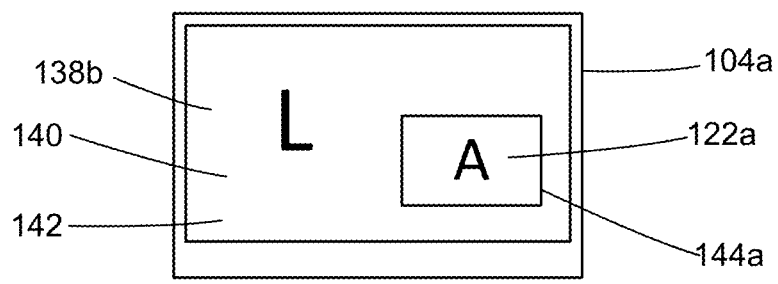

FIG. 3b illustrates a display device 104b on which an output video signal 138b is displayed. Output video signal 138b includes central video content 140 generated locally at the central computer 112, and, also includes source video signal 122a in a display window 144. In this example, the central video content 140 (having content represented by the letter L) is displayed in a full screen layer 142. Source video signal 122a, originating from video source 102a, is scaled to fit into window 144a and is displayed superimposed on the full screen layer 142, in front of the central video content 140.

A window that is displayed in front of, or superimposed on, another window or the background full screen layer can be said to be in a higher visual layer, or in what may be referred to as a higher layer in the z dimension, than the other window or background full screen layer. The background full screen layer is typically generated by the operating system of a computer and is typically behind all other windows, in the lowest visual layer. Other content is displayed in windows in front of, or in a higher visual layer than, the background full screen layer. Such other content may include other applications operating on the central computer, in addition to windows 144 displaying video content from the video sources 102.

In general, video content from any of the video sources or the central computer may be displayed in any output video signal in either the background full screen layer or in a display window in a higher layer.

An output video signal 138 may include a variety of content generated by or at the central computer 112. In addition to the full screen layer, which may contain a background display, other content generated at the central computer may be displayed in windows in an output video signal. Source video signals 122 are also displayed in windows, which are referred to herein as display windows 144. The windows (regardless of whether they contain locally generated content or they are display windows containing a source video signal) may be arranged in the z layer in any order, in accordance with the operating system of the central computer 112.

Figure 3C:
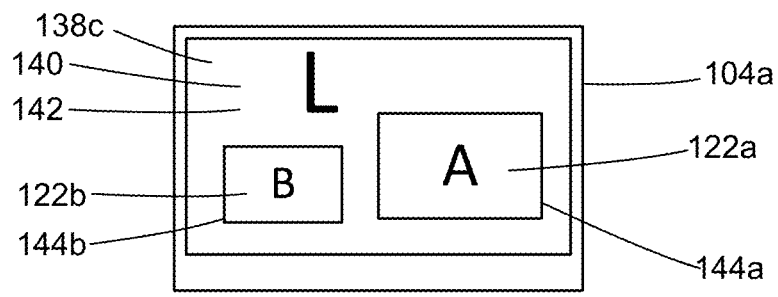

FIG. 3c illustrates an output video signal 138c in which two source video signals 122a and 122b (having content respectively represented by the letters A and B) are displayed in separate display windows 144a and 144b, respectively, in front of central video content 140, which is in the background full screen layer 142. Each of the source video signals 122 may be scaled or cropped to fit into its corresponding display window 144. The display windows 144 may have equal or unequal sizes, as shown in FIG. 3c. The display windows may be resized using central computer 112's HID devices or in any other manner permitted by the operating system of central computer 112.

Figure 3D:
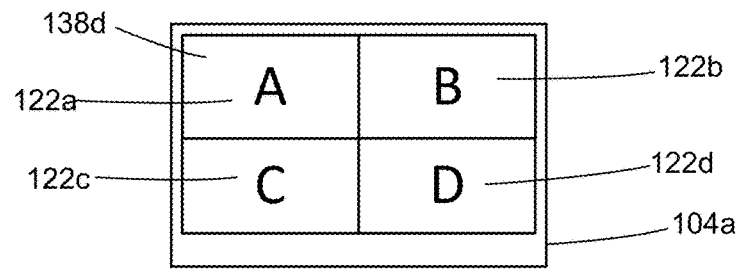

FIG. 3d illustrates an output video signal 138d in which the entire output video signal 138 consists of several source video signals 122a-d (having content represented by the letters A-D) tiled together to file the display screen of a display device.

Figure 3E:
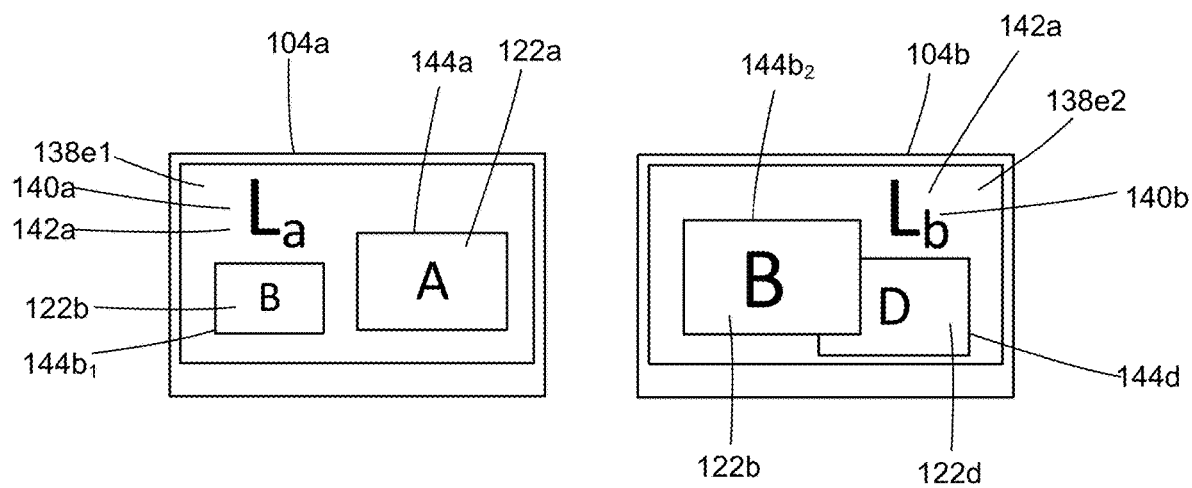

FIG. 3e illustrates two output video signals 138e1 and 138e2. The two output video signals include various source video signals 122 in various layers. Output video signal 138e1 includes central video content 140a (having content represented by the letters $L_a$) in a background full screen layer and several source video signals 122a and 122b displayed in display windows 144. Output video signal 138e2 includes a different central video content 140b (having content represented by the letters $L_a$) in its background full screen layer, and several source video signals 122b and 122d (having content respectively represented by the letters B and D) displayed in display windows 144. The example illustrates that the same source video signal 122b may be displayed on more than one display device 104 as part of different output video signals 138.

Many other configurations of source video signals 122 may be displayed in an output video signal 138. Display windows 144 will typically be displayed in a manner consistent with the operating system or other configuration of central computer 112.

Figure 4:
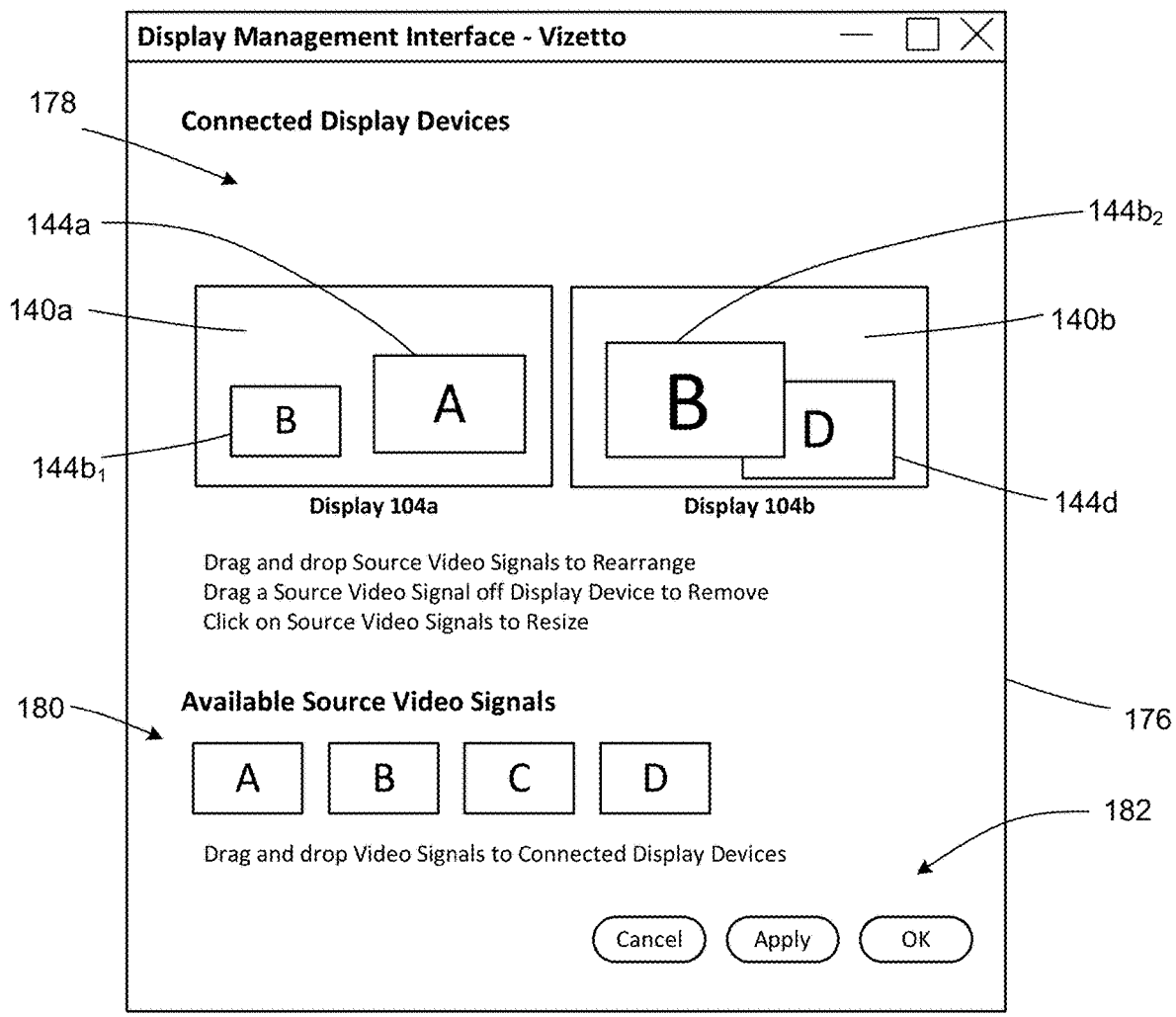
FIG. 4 illustrates a display management interface.

Reference is next made to FIG. 4, which illustrates a display management interface 176. Display management interface 176 will typically be displayed in an output video signal 138 that is displayed on a display device 104 coupled to central computer 112 under the control of the display management module 124. The display management interface 176 will typically be displayed in a display window consistent with the operating system or other configuration of the central computer 112. The display management interface depicts the display devices 104 that are coupled to the central computer 112 and the layout of video signals 122 on each of display devices 144. In the example, of FIG. 4, in region 178, display devices 104a and 104b are each illustrated as having several display windows 144 in which respective source video signals 122 are displayed, in the arrangement of FIG. 3e.

The source video signals available to be displayed on a display device 104 are shown in region 180. The display management interface 176 allows a user of the central computer 112 to select and arrange source video signals on the display devices 104. A user may add a source video signal 122 to a display 104 by dragging and dropping the source video signal from region 180 to a display device 104 in region 178. A display window 144 will be created by the display controller 108 to display the source video signal 122 on the respective display device 104. A display window 144 may be resized by clicking on the display window. When the display window is clicked, the display controller 108 shows resizing tools that allow the size and shape of the window to be changed. A display window 144 may be moved within the output video signal of a display device 104 by dragging and dropping the display window. A display window 144 may be removed from a display device 104 by dragging it off the display device 104. The display of source video signals 122 in the respective output video signal 138 on the display devices 104 may be changed by the display controller 108 in real time as the user makes changes within the display management interface 176. In other embodiments, the display controller may make changes to the display of source video signals 122 on the display devices 104 only after a user has finalized them by, for example, clicking on an "Apply" or "OK" button, as shown at 182.

In this example, locally generated content is not displayed in the display management interface, although in other embodiments, such locally generated content may be shown, and a user may be able to select and arrange windows in which locally generated content is displayed, while selecting and arranging display windows 144.

The specific gestures and actions for selecting and arranging source display signals 122 on display devices 104 are merely examples and any other gestures or actions may be provided to allow a user to select and arrange the source video signals 122 displayed on the display devices 104.

Figure 5:
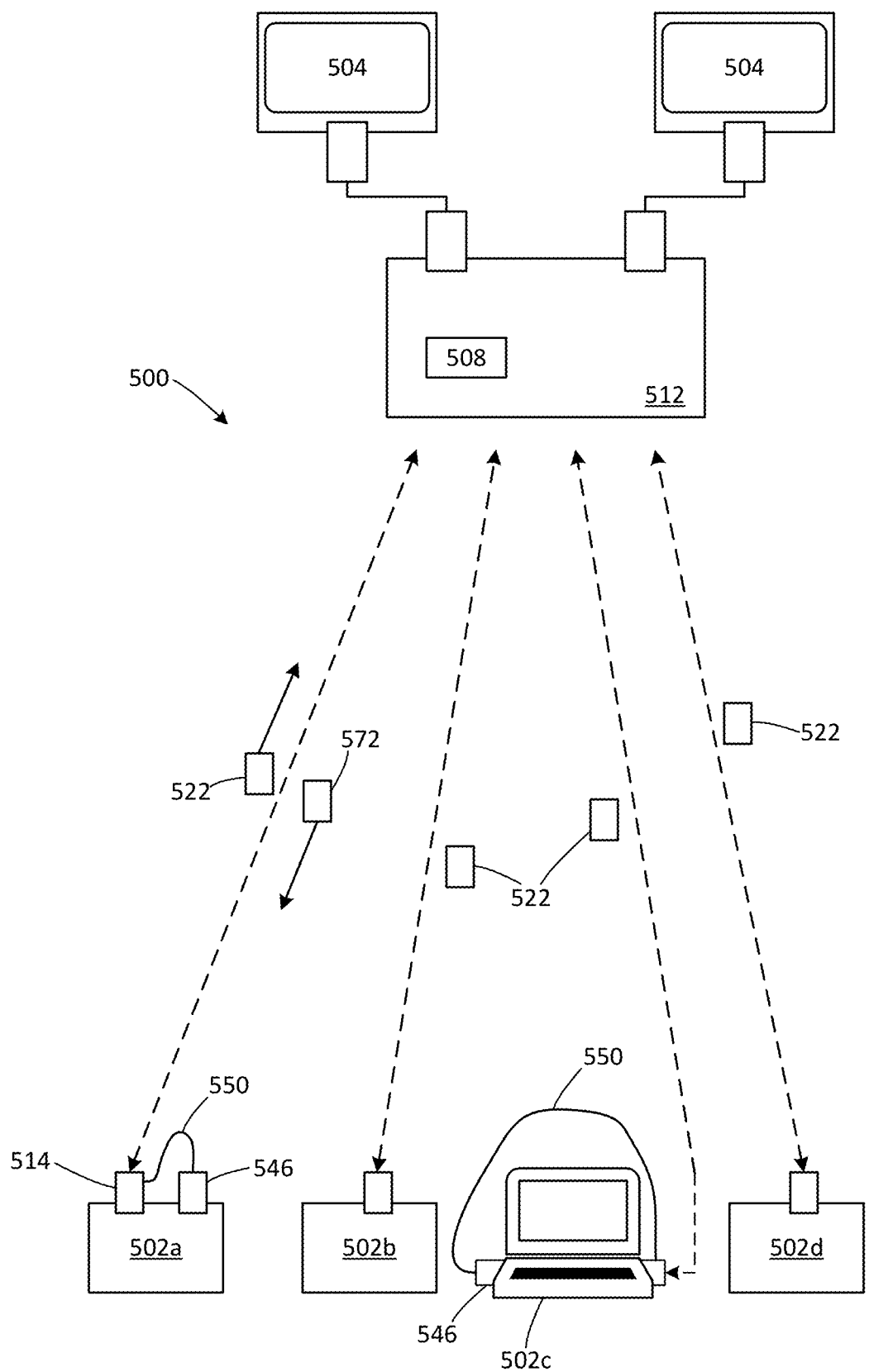
FIGS. 5 and 6 illustrate a second example display system.
Figure 6:
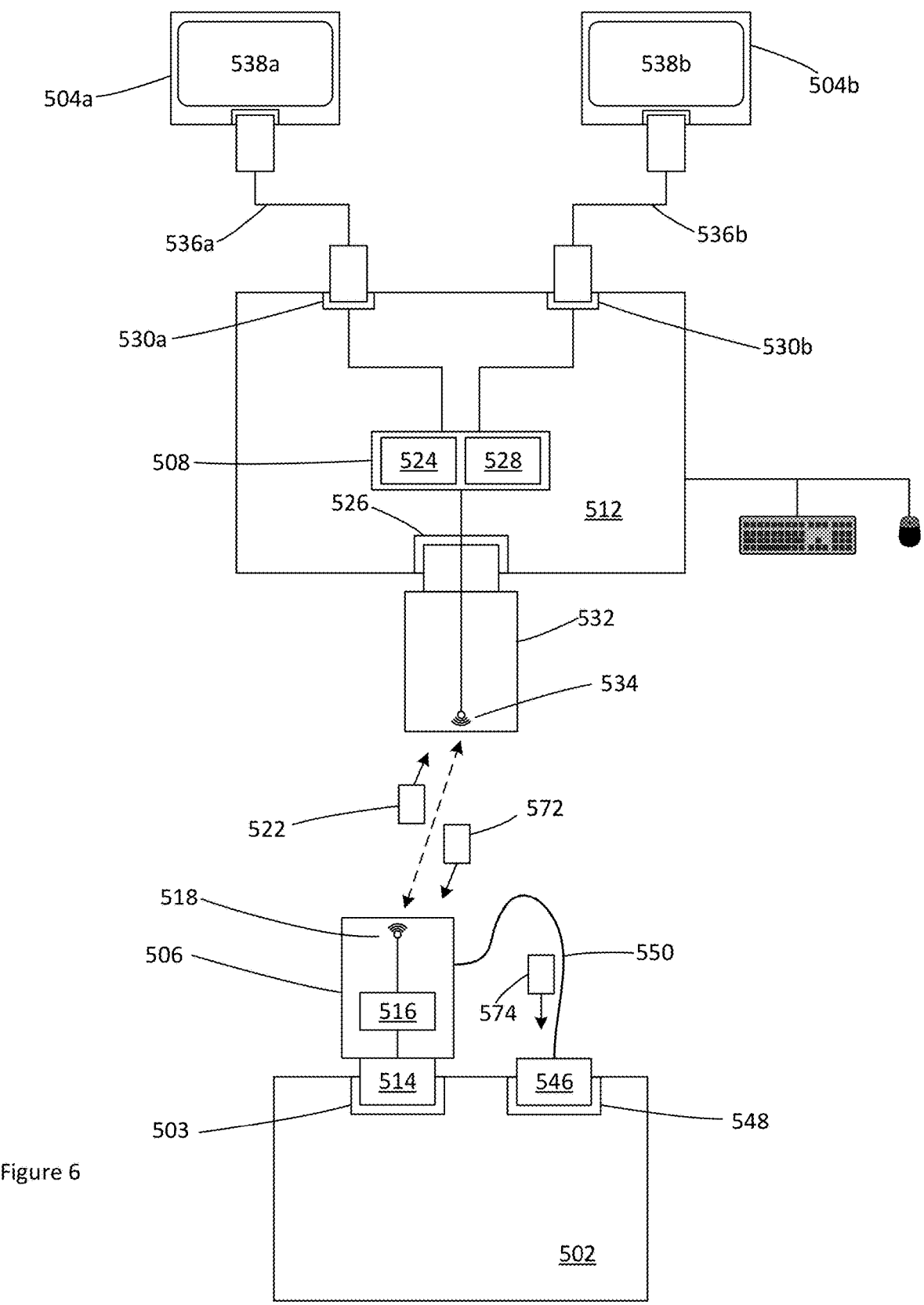

Reference is next made to FIGS. 5 and 6, which illustrate another video display system 500. Elements of system 500 that correspond to elements of systems 100 and 400 are identified with corresponding reference numerals. Source dongle 506a, like source dongles 106, has a video source connector 514 that can be connected to or plugged into a video output port 503 on a video source 502; a dongle processor 516 and a dongle transceiver 518. In addition, dongle 506 has a data connector 546 that can be connected to a data communication port 548 on a video source. For example, data connector 546 may be any type of serial or parallel data communication connector. The data connector 546 is coupled to the dongle 506 with a cable 550, to allow data connector 546 to be positioned as required to be connected to the data communication port 548 while video source connector 514 is connected to the video output port 503 of a video source 502.

Data communication port 548 is coupled to the data input/output system of video source 502a. For example, each video source 502 will typically include a processor that can receive input from and provide input to data communication port 548, through data input and data output module, which are typically part of the operating system operating on the video source. For example, in this example, data communication port 548 is a USB port which allows external devices, including HID devices such as a mouse or keyboard, to be used to provide inputs to video source 502. In other embodiments, the data communication port 548 may be any other type of port that allows inputs to be provided to the video source 502. Typically, the data communication port 548 will allow bidirectional communication between the video source 502 and a dongle processor 516 when dongle connector 546 is coupled to the data communication port.

Dongle processor 516 is in bidirectional communication with the display controller 508 operating on central computer 512, allowing the dongle processor 516 to exchange data with the display controller 508 including the source video signal 522 transmitted by dongle processor to the display controller.

Figure 7:
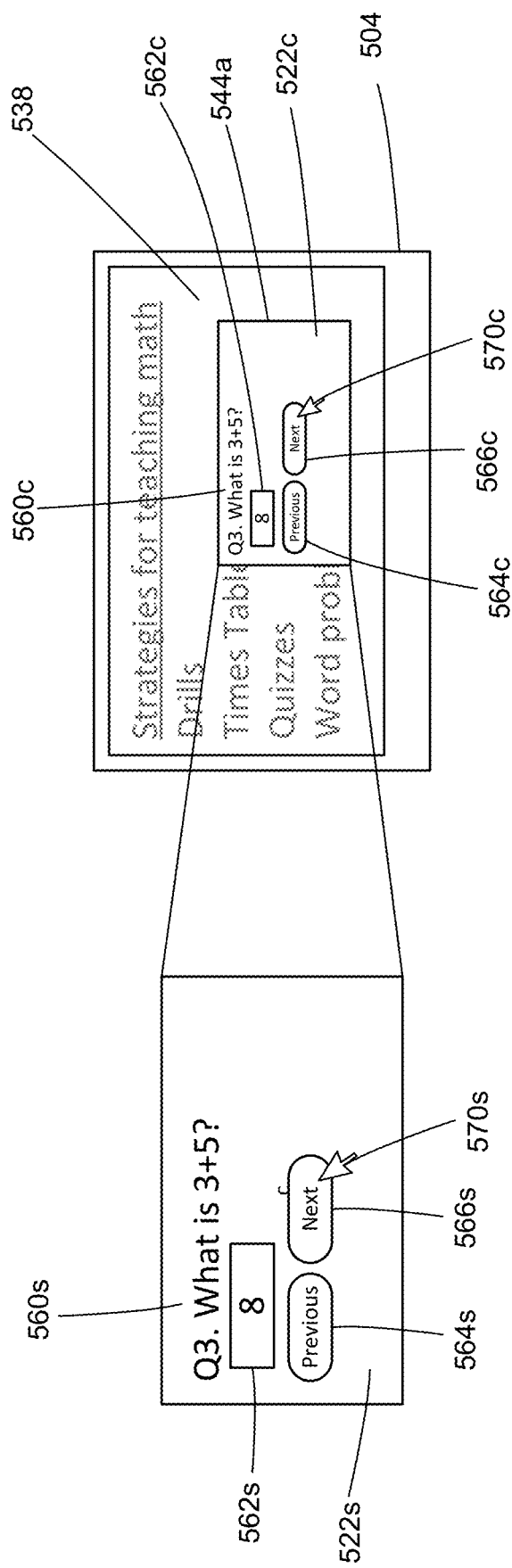
FIG. 7 illustrates a source video signal and an output video signal.

Reference is additionally made to FIG. 7, which illustrates a source video signal 522s as it would appear if displayed full screen on a display device, as is shown for example in FIG. 3c, and a corresponding scaled version of the source video signal 522c as it appears in a window on an output device. (In FIG. 7, the subscript "s" identifies elements in a source video signal and the subscript "c" identifies corresponding elements shown in an output video signal 138 on a display device 504 coupled to the central computer 512.) In this example, source video signal 522s has a full resolution of 1920×1080 pixels. FIG. 7 also illustrates a display device 504 on which the source video signal is displayed in a display window 544a. Display window 544 has a size of 800×450 pixels, and source video signal 522c is scaled to fit into display window 544a. Source video signal 522 includes a question 560 (which may be part of a series of questions in a quiz) in response to which a user of central computer 512 may enter an answer in a dialog box 562, and two buttons 564 and 566 labelled "Previous" and "Next" to allow a user to move to the previous or next question in the quiz.

The user may select window 544 to make it the active window on central computer 512 in accordance with the functionality of the operating system of the central computer. For example, the user may be able to make a window the active window by clicking on the window using a mouse connected to the central computer. Depending on the operating system and configuration of the central computer 512, a user may be able to make a window the active window using a keyboard connected to the central computer; by rolling a mouse cursor onto the window; by rolling a mouse cursor onto the window and then clicking a mouse button. Various operating systems and input devices may provide various methods of making a window the active window.

A user may provide inputs to a window when it is the active window. For example, the user may click a mouse button while a mouse pointer is positioned on the dialog box 562c or on the Previous button 564c or Next button 566c within window 544a. The user may also enter text on a keyboard coupled to the central computer 512 while window 544a is active. User inputs in window 544a (i.e. while window 544a is active) are directed by the operating system of central computer 512 to the display controller 508. Display controller 508 determines the location within window 544 at which the user made a mouse input and scales the location of the input to the original resolution of source display signal 522s. For example, if the user clicks within window 544 at pixel position 520×280 (the position of arrow 570c in window 544), the display controller scales that click position to a corresponding full scale pixel position 1248× 672 in the full 1920×1080 pixel resolution of source video signal 122s, as shown by arrow 570s.

Display controller 508 transmits a remote input message 572 identifying an input type of "mouse click" and the full scale pixel position to the dongle processor 516.

Examples of remote input messages may include:

Mouse movements—As a user of the central computer moves the mouse cursor 570c in the scaled source input signal 522c within window 544, the display controller may generate a remote input message indicating the corresponding position of the mouse cursor in the full scale source display signal. Alternatively, a remote input message may indicate that direction, and optionally the rate of motion, of the mouse cursor within window 544.

Mouse clicks—When the user clicks a mouse button, a remote input message may identify the button (i.e. left button, right button, wheel button, back button) and that the button has been clicked. In some embodiments, remote input messages may identify a momentary click, a long click (for example by providing the time between a button being clicked and then released), a double click, button pressed and button released events.

Keyboard inputs—When the user presses a key on a keyboard coupled to central computer 512 while a display window 544 is active, the identity of the key is passed to the corresponding source dongle processor 516.

In response to the remote input message 572, dongle processor 516 generates a corresponding input signal 574 at the data connector 546. The input signal 574 is passed to the data input/output system of the video source 502. The video source responds to the input signal as though the user input (which actually occurred on the central computer 512) had occurred at the video source 502 (mimicking the use of a keyboard, mouse or other human interface device couple to the video source 502). Depending on the user input, the source video signal 522s generated by the video source 502 may change, and this change will be displayed in scaled version 522c of the source video signal in window 544. This allows a user of the central computer to effectively use or control a video source 502. For example, the user may answer the question shown in source video signal 522 and move to the next question in the quiz by:

Activating window 544 on central computer 512.

Moving the cursor to dialog box 562c. The user controller 508 will transmit the mouse movement to video source 502, and source video signal will show a cursor on the dialog box 562. It should be noted that two cursors may be displayed in window 544. The first will be cursor of the input/output system of the central computer, which may be displayed anywhere on the output video signal 538. The second will be the cursor in the source video signal 522, which can only be displayed within window 544. When system 500 is used to control video source 502, the two cursors may be aligned within window 544, although the central computer's cursor may overlie and obscure the cursor of the source video signal.

Clicking on dialog box 562c while the cursor is over dialog box 562c. The user controller 508 will transmit the click to the video source 502, which will then make the dialog box 562 active for user input. The dialog box may change appearance when it becomes active. For example, a text cursor may be displayed in the dialog box.

Pressing the '8' key on the central computer's keyboard. The user controller 508 will transmit the key press to the video source 502, which will display the key value into dialog box 562, as shown in FIG. 7.

Moving the mouse curser to the 'Next' button 566c. The user controller will transmit the mouse movement to video source 502 and the source video signal will show the location of the cursor 566c as in FIG. 7. (FIG. 7 is shown at this step in this process.)

Clicking the mouse button. The user controller 508 will transmit the mouse click to the video source, which will interpret it as the button 570 being clicked. The corresponding action will be taken, which in this case will result in question 4 in the quiz being displayed in the source video signal.

Using system 500, a user of the central computer 512 may control any video source 502 if a source video signal 522 from that video source is displayed on any display device 544 coupled to the central computer. If source video signals 522 from multiple video sources are displayed in corresponding windows 544 on any display device 504 coupled to the central computer, then user inputs (typically mouse and keyboard inputs, but also including inputs from any other type of input device) that are received by the user computer while a particular window 544 is active may be transmitted to the corresponding video source 502 in a remote input message. The video source 502 can then handle the user input in accordance with its configuration and programing, including any changes in it source video signal 522, which will be visible to the user at the central computer 512.

In system 500, a bidirectional data communication channel is established between each dongle processor 516 and the display controller 508, allowing remote user inputs to be transmitted from the display controller 508 to the corresponding video source dongle 502. Typically, the data communications channel may also be used for other data interchange between the video sources and the central computer, including handshaking, synchronization, configuration and other data. In a system in which no data (beyond the transmission of a source video signal) is required to be transmitted from a video source to a central computer, a unidirectional data channel allowing for the transmission of remote input messages from the central computer to the video source may be used. In some embodiments, an ancillary data channel, back haul data channel or other data communications channel associated with the transmission of a source video signal may be used to transmit remote input messages.

Figure 8:
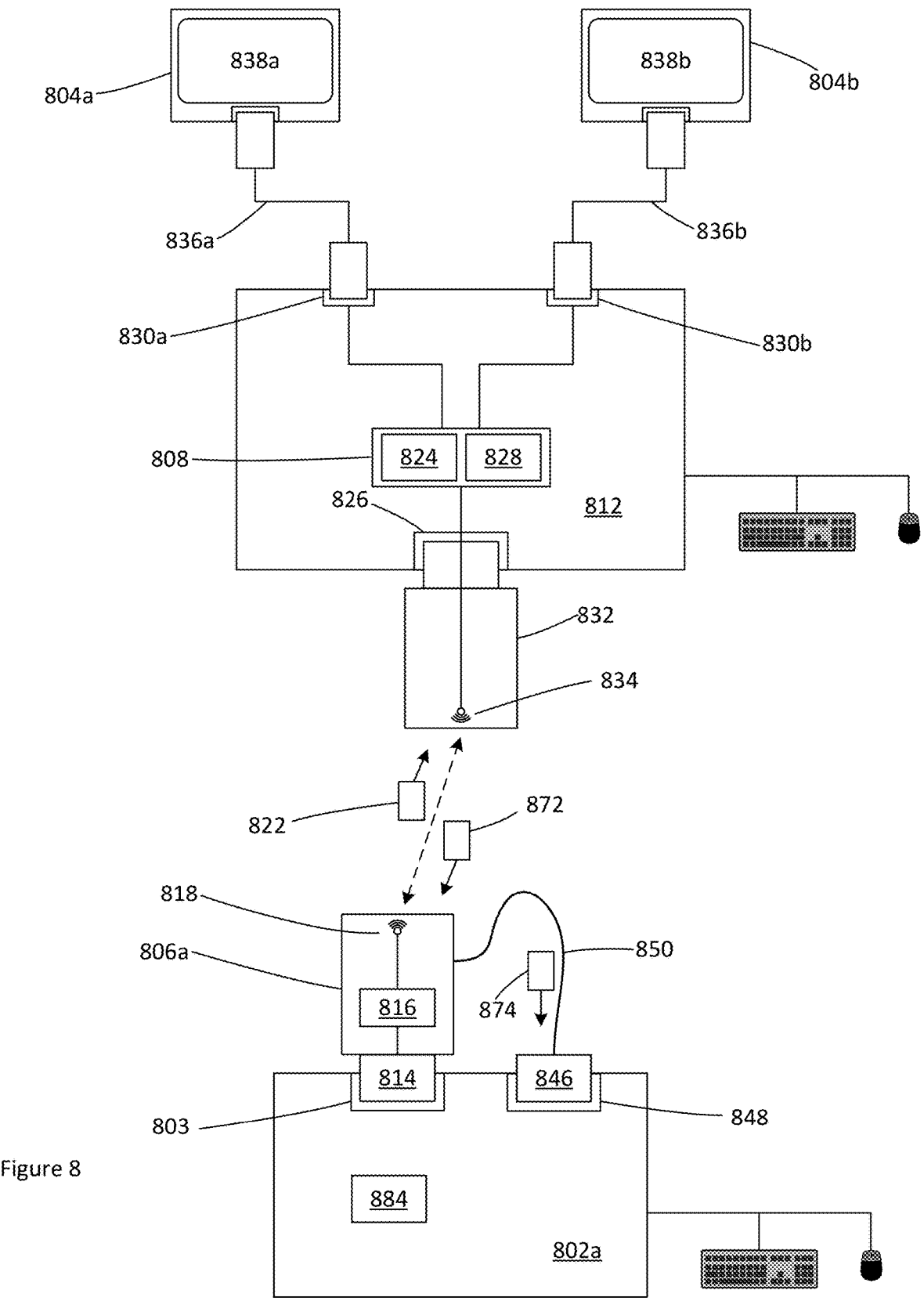
FIG. 8 illustrates a third example video display system.

Reference is next made to FIG. 8, which illustrates another video display system 800. Elements of system 800 that correspond to elements of systems 100, 400 and 500 are identified with corresponding reference numerals. The systems described above allow source video signals from a plurality of video sources to be display on output devices coupled to a central computer. In some embodiments, a video display system may allow a user of a video source to control the display of source video signals from a plurality of video sources, including one or more source video signals provided from the user's video source, on one or more display devices coupled to a central computer. System 800 illustrates such an embodiment.

In system 800, the display management module 824 in the display controller 808 is in communication with a display configuration module 884 operating or running on source device 802a through source dongle 806a and controller dongle 832, as described above. Display configuration module 884 is a software module and provides a display management interface similar to display management interface 176 on the display of source device 802a. A user may control the selection and arrangement source video signals to be displayed on the display devices 804 coupled to the central computer 812 using human interface devices such as a mouse or keyboard coupled to the source device 802a. The selections and arrangements chosen by the user are transmitted from the display configuration module 884 to the display management module 824 and the display controller 808 implements those selections and arrangements in the output video signals 838 shown on the display devices 804. System 800 allows a user of a video source 802 to control the display of multiple source video signals 822 from various video sources on the display devices 804.

Figure 9:
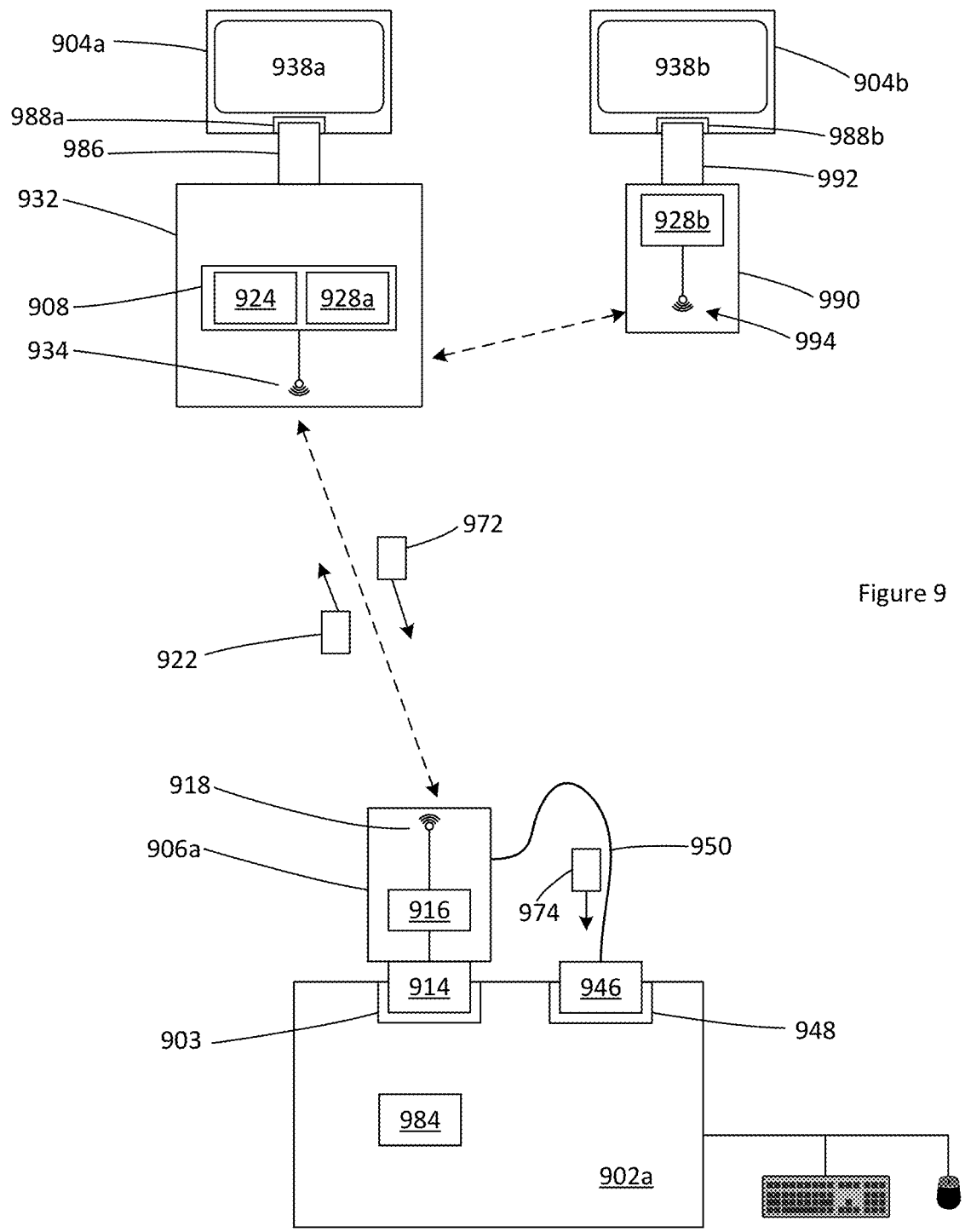
FIG. 9 illustrates a fourth example video display system.

Reference is next made to FIG. 9, which illustrates another display control system 900. Elements of system 900 that correspond to elements of systems 100, 400 500 and 800 are identified with corresponding reference numerals. In system 900, the controller dongle 932 includes a display controller 908, which generates an output video signal 938a that is displayed on display device 904a. The controller dongle 932 includes a video output connector 986 that can be coupled to a video input on a display device 904, either directly as shown in FIG. 9, or through a video cable such as video cable 136 (FIG. 2). In the example of FIG. 9, controller dongle 932 has an integrated video connector consistent with a video interface that plugs directly into a complementary video input port 988a on display device 904a. As in the display control systems described above, display controller 908 is in communication with dongle processor 916 to receive a source video signal 922. A display configuration module 984 operating at video source 902a may be used as described above in relation to system 800 to control the display of multiple source video signals 922 from various video sources on the display device 904a.

Controller dongle 932 may also be used to control the display of multiple source video signal 922 to display on additional display devices, such as display device 904b. In the example embodiment of FIG. 9, a secondary video dongle 990 is coupled to a video input port 988b on display device 904b. Secondary video dongle 988 has a secondary dongle controller 928b that is in communication with display controller 908 through a secondary dongle transceiver 994 and controller transceiver 934. Display controller 908 generates an output video signal 938b and transmits it to secondary dongle controller 928. Secondary dongle controller 928 receives the output video signal 938b from the display controller 909, and provides the output video signal 938b to display device 904b through a video output connector 992 that is plugged into complementary video input port 988b on display device 904b.

Display configuration module 984 operating at video source 902a may be used to control the display of multiple source video signals 922 from various video sources on the display device 904b, as described above in relation to video display system 800.

In the example of FIG. 9, the controller dongle 932 is plugged into a first display device 904a and is in wireless communication with a secondary video dongle. In other embodiments, the controller dongle 932 and the secondary video dongle may communicate through a wired cable. In other embodiments, the controller dongle may have a second wireless transceiver for communication with a secondary video dongle.

System 900 provides an integrated controller dongle and optionally one or more secondary video dongles 990 that allow multiple source video signals to be selectively and controllably displayed on display devices 904 without the need for a central computer.

Figure 10:
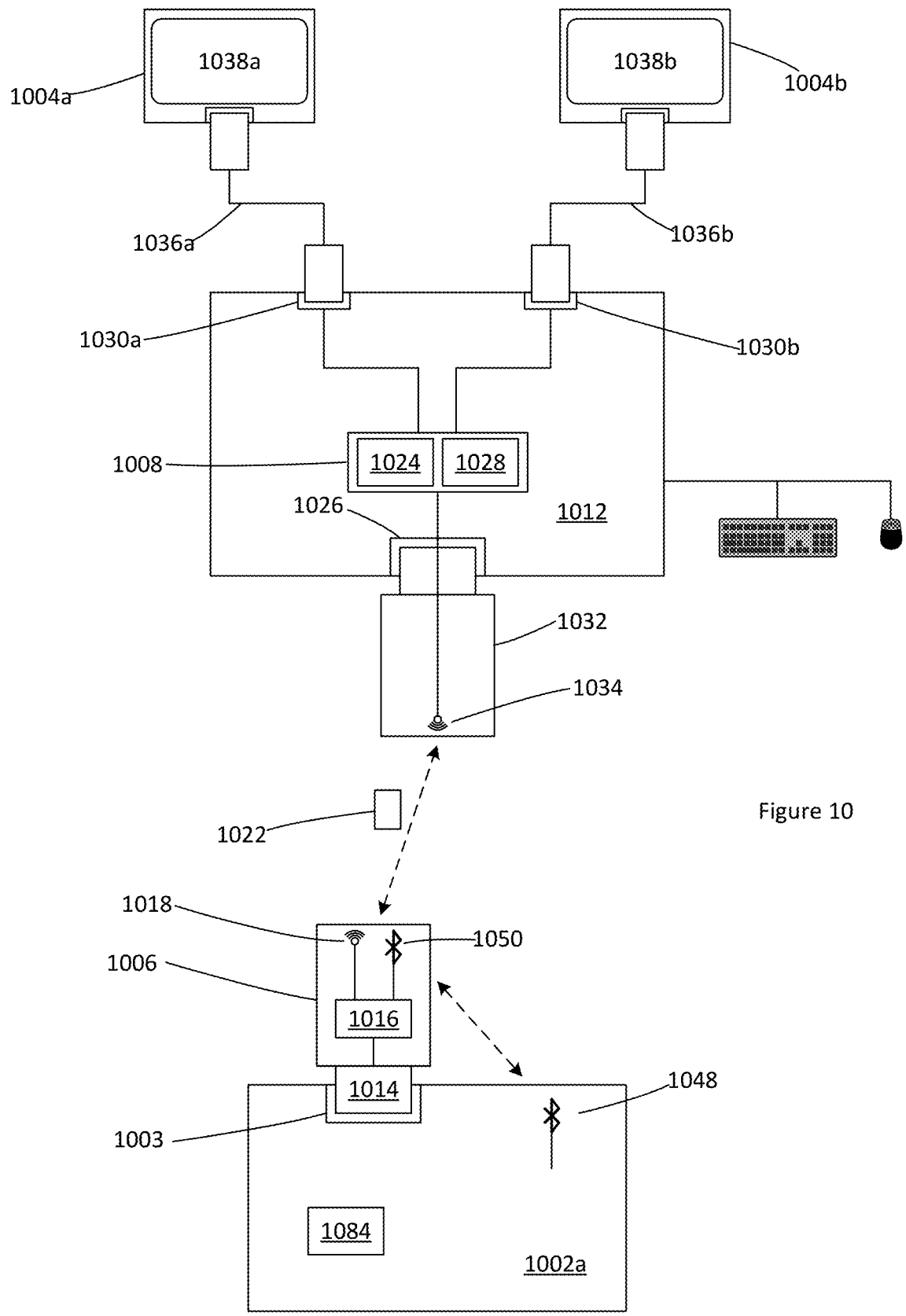
FIG. 10 illustrates a fifth example video display system.

Reference is next made to FIG. 10, which illustrates another video display system 1000. Elements of system 1000 that correspond to elements of system 500, 800 and 900 are identified with corresponding reference numerals. In system 1000, a video source dongle 1006 has a dongle processor that is operable as described in relation to the video display systems described above to allow multiple video signals 1022 to be displayed on one or more display devices 1004. In addition, dongle processor 1016 is in is in bidirectional communication with display controller 1008 to exchange data with the display controller 1008 and to receive user inputs from central computer 1012, as described above in relation to system 500. Video source dongle 1006 has a wireless data communication transceiver 1050 that is in communication with a wireless source device transceiver 1048 of video source 1002a. Wireless source device transceiver 1048 is coupled to the data input/output system of video source 1002a. User inputs received by the dongle controller 1016 from central computer 1012 may be transmitted to the video source 1002a through the wireless communication between transceivers 1050 and 1048. This allows remote user inputs at central computer 1012 to be provided to a video source without data connector (such as data connector 546) coupled to the video source dongle through cable, and without occupying a data communication port on the video source. The wireless data communication transceiver 1050 and the wireless source device transceiver 1048 may use any suitable protocol to communicate data. For example, a Bluetooth™ protocol may be used.

In some embodiments, the wireless source device transceiver 1048 may be an external wireless dongle connected to a data communication port. For example, the external wireless dongle may have a USB connector that plugs into a USB data communication port, and may have a wireless transceiver that can communicate with wireless data communication transceiver 1050 in source dongle 1006.

In some embodiments, a video source dongle may include both a wired data connector (as described in relation to system 500) and a wireless data communication transceiver 1050 to the video source dongle to provide user inputs and exchange other data with a video source through either a wired or a wireless connection, or both.

Figure 11:
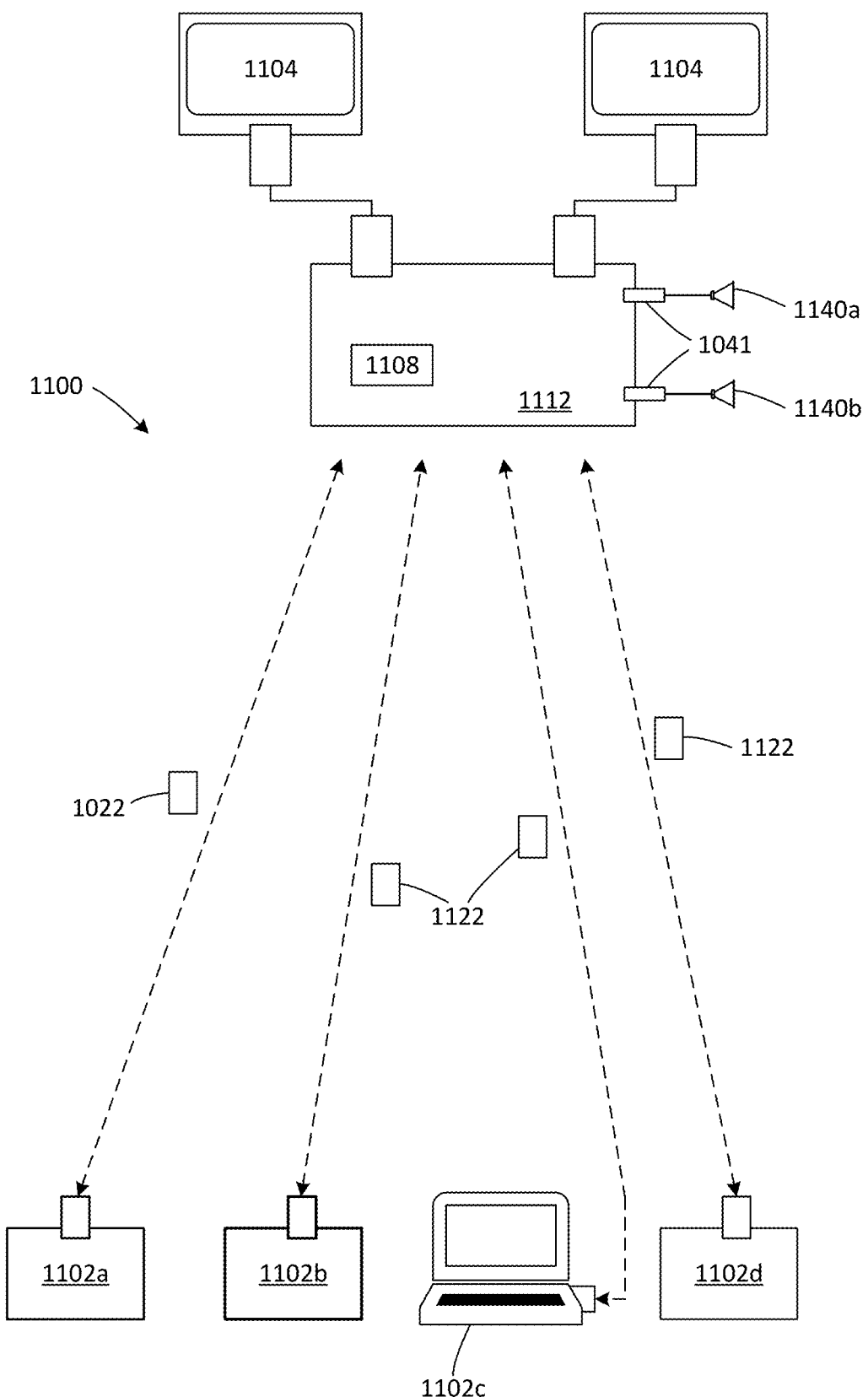
FIG. 11 illustrates a sixth example video display system.

Reference is next made to FIG. 11, which illustrates another video display system 1100. Elements of system 1100 that correspond to elements of the other video display systems described herein are identified with corresponding reference numerals. System 1100 includes a plurality of audio output devices 1140 such as audio speakers, which are coupled to the central computer through audio ports 1141. In addition, some of the display devices 1104 include speakers that may be used to provide audio output and may be referred to as audio-enabled display devices. Audio output devices 1140 and audio-enabled display devices may be collectively referred to as audio playback devices 1142.

Some video interfaces, including HDMI and DisplayPort, can carry audio together with video. Some video sources 1102 may provide a source video signal that includes source audio data to the source dongle 1106. The dongle processor 116 includes the source audio data with wireless video signal 1122 transmitted to the central computer 1112. At the central computer 1112, the display controller 1108 may transmit the audio data to an audio playback device 1142. For example, audio received with a particular source video signal 1122 may be transmitted to a display device 1104 through the corresponding video output port. As another example, audio received from a particular source video signal 1122 may be provided to an independent audio output device 1140.

The display controller 1108 may be configured to couple audio corresponding to a particular wireless video signal to an audio playback device 1142. Typically, the display controller will have an interface that allows a central computer user to select audio that is coupled to any particular audio playback device 1142. In some embodiments, the display controller may be configured or configurable to automatically couple audio from a particular source device 1102 to some or all audio playback devices. For example, if only source device 1102 is transmitting audio to the display controller 1108, then the display controller 1108 may automatically couple that audio to some or all audio playback devices. In other embodiments, the display controller may be configured or configurable to automatically couple audio generated locally at the central computer 1112 to one or more audio playback devices in priority to, or in the absence of, audio from one of the source devices 1102.

System 1100 may be used to reproduce various combinations of source video signals (with and without corresponding audio data) and locally generated content (which may also include audio) on display devices and audio output devices, as described in relation to the other video display systems described above.

Figure 12:
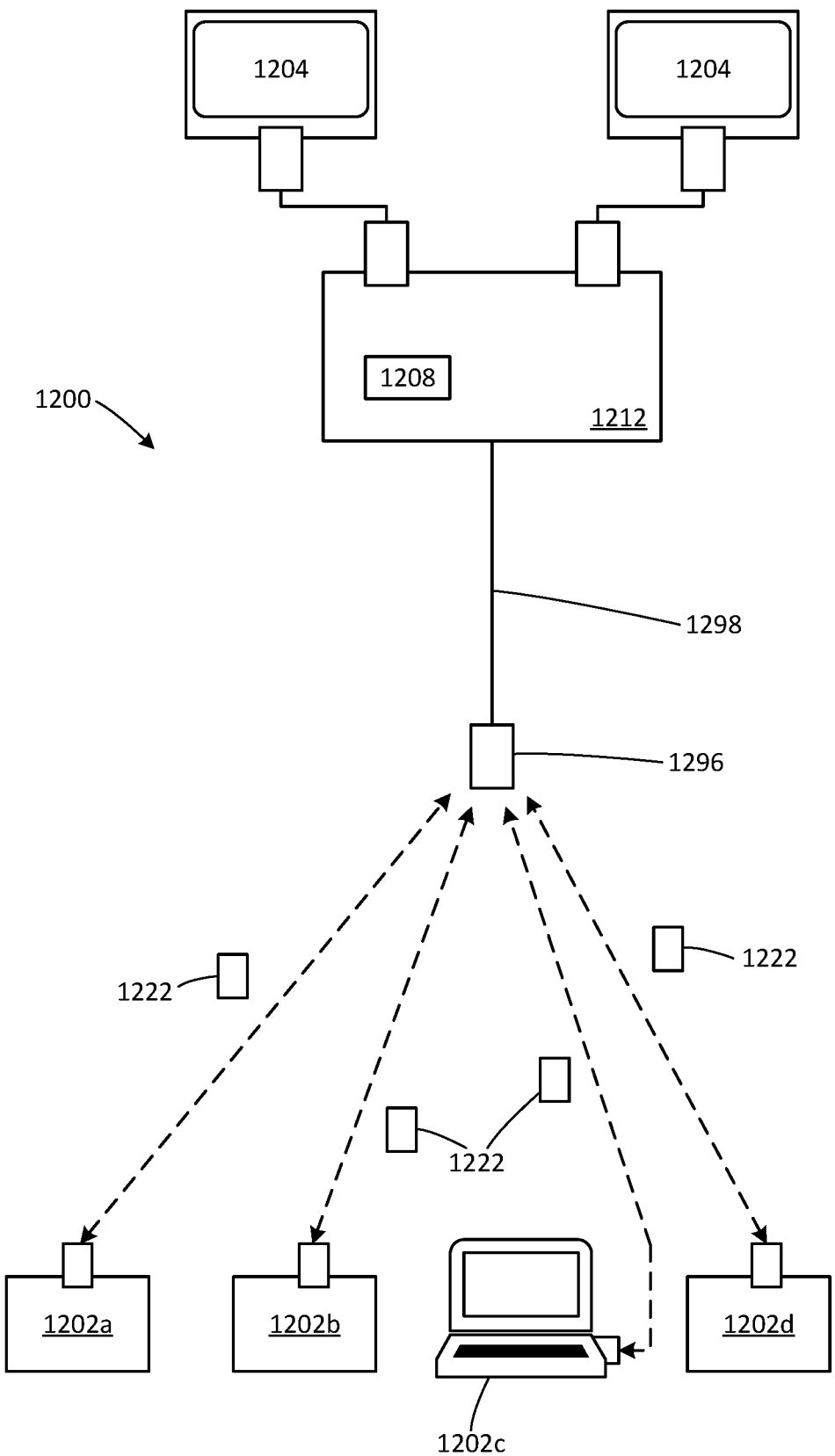
FIG. 12 illustrates a seventh example video display system.

Reference is next made to FIG. 12, which illustrates another video display system 1200. The video display systems described above describe a wireless communication link between each source dongle and the display controller in the respective system.

In system 1200 the communication link between source dongles 1206 and the display controller 1208 is provided through a communication hub 1296. Communication hub is coupled to central computer 1212 through a cable 1298. Each source dongle 1206 communicates with a communication hub 1296, which is coupled to the central computer 1212 to allow communication between the display controller 1208 (and other elements on the central computer 1212) and the video sources 1202. The communication hub 1296 may be coupled to the central computer through a cable, through a communication network such as a local wireless network, a wide area network such as the Internet. The central computer may in a location remote from some or all of the video sources 1202, allowing video sources in different locations to provide source video signals on display devices 1204.

The hub of system 1200 may be used with any of the systems described above. In various embodiments, different source devices may be coupled to a central computer or to a controller dongle in various methods. For example, some source devices may be connected to a central computer or controller dongle through a wired or wireless network while others are connected through a hub.

Various example embodiments of the present invention have been described here by way of example only. Various modification and variations may be made to these exemplary embodiments without departing from the spirit and scope of the invention.

The invention claimed is:

1. A video display system comprising:
    two or more video source dongles, each video source dongle having:
        a video source connector for receiving a source video signal, wherein the video source connector is adapted to be coupled to a video output port of a video source; and
        a dongle transceiver; and
        a dongle controller for wirelessly transmitting the source video signal by the dongle transceiver;
    a controller dongle, the controller dongle having a controller transceiver for receiving each of the source video signals;
    a display controller having a video signal processor for generating one or more output video signals, each output video signal including one or more of the source video signals; and
    a display configuration module adapted to operate on a source device, wherein the display configuration module is in communication with a display management module, and wherein the display configuration module displays a display management interface to allow control of the selection and arrangement of the display of two or more source video signals in one or more output video signals, and wherein the display management module transmits the selection and arrangement to the display configuration module.

2. The system of claim 1 wherein, at each of one or more video source dongles, the video source dongle includes videos source dongle software adapted to extract video information from the corresponding source video signal and to transmit the extracted video information in a packetized video signal that encapsulates the extracted video information.

3. The system of claim 2 wherein each packetized video signal is in a standard video encoding format.

4. The system of claim 1 wherein the display controller is a software controller operating on a computer coupled to the controller dongle.

5. The system of claim 1 wherein the display controller is a software controller operating on the controller dongle.

6. The system of claim 1 wherein the display controller further includes a display management module operable to allow control of the display of two or more source video signals in one or more output video signals.

7. The system of claim 6 wherein the display controller operates on a central computer, wherein the controller dongle is coupled to a data communication port of the central computer, and wherein the display management module provides a display management interface in one of the output video signals to allow control of the display of two or more source video signals in one or more output video signals.

8. The system of claim 1 wherein at least one source dongle includes a data connector adapted to be coupled to a data communication port a corresponding video source, and wherein the display controller is configured with computer program instructions adapted to:
    receive a user input at the central computer; and
    transmit a remote input message corresponding to the user input, and wherein the dongle controller is configured with computer program instructions to:
    receive the remote input message; and
    to generate an input signal at the data connector, wherein the input signal corresponds to the user input.

9. The system of claim 1 wherein the display controller operates on the controller dongle, wherein the controller dongle includes a video output connector, and wherein the display controller generates an output video signal at the video output connector.

10. The system of claim 9 further comprising one or more secondary video dongles, wherein each secondary video dongle includes a secondary dongle controller and a video output connector, wherein each secondary video dongle is in wireless communication with the controller dongle to receive an output video signal from the controller dongle and to provide the received output video signal at the video output connector.

* * * * *